United States Patent
Shah et al.

(10) Patent No.: US 6,742,698 B2
(45) Date of Patent: Jun. 1, 2004

(54) REFRACTORY METAL BACKING MATERIAL FOR WELD REPAIR

(75) Inventors: Dilip M. Shah, Glastonbury, CT (US); James T. Beals, W. Hartford, CT (US); Norman Pietruska, Durham, CT (US); Edward R. Szela, W. Springfield, MA (US)

(73) Assignee: United Technologies Corporation, Hartford, CT (US)

( * ) Notice: Subject to any disclaimer, the term of this patent is extended or adjusted under 35 U.S.C. 154(b) by 87 days.

(21) Appl. No.: 10/167,679

(22) Filed: Jun. 10, 2002

(65) Prior Publication Data

US 2003/0226878 A1 Dec. 11, 2003

(51) Int. Cl.$^7$ .............................. B23K 9/00; B23P 6/00
(52) U.S. Cl. .................. 228/119; 228/171; 228/246; 29/889.1
(58) Field of Search .............................. 228/119, 245, 228/246, 170, 171; 29/889.1

(56) References Cited

U.S. PATENT DOCUMENTS

| | | | | | |
|---|---|---|---|---|---|
| 4,110,887 | A | * | 9/1978 | Kachik | 228/119 |
| 4,705,203 | A | * | 11/1987 | McComas et al. | 228/119 |
| 4,775,602 | A | * | 10/1988 | Rasch | 428/668 |
| 5,175,411 | A | * | 12/1992 | Barber | 219/137 R |
| 5,666,643 | A | * | 9/1997 | Chesnes et al. | 428/549 |
| 5,806,751 | A | * | 9/1998 | Schaefer et al. | 228/119 |
| 6,193,145 | B1 | * | 2/2001 | Fournier et al. | 228/262.41 |
| 6,283,356 | B1 | * | 9/2001 | Messelling | 228/119 |
| 6,332,272 | B1 | * | 12/2001 | Sinnott et al. | 29/889.1 |
| 6,413,578 | B1 | * | 7/2002 | Stowell et al. | 427/142 |
| 6,470,568 | B2 | * | 10/2002 | Fried et al. | 29/889.1 |
| 2002/0100793 | A1 | * | 8/2002 | Fried | |
| 2003/0052110 | A1 | * | 3/2003 | Gandy et al. | |
| 2003/0118448 | A1 | * | 6/2003 | Lee et al. | |

FOREIGN PATENT DOCUMENTS

JP  405195717 A  *  8/1993

* cited by examiner

*Primary Examiner*—Kiley Stoner
(74) *Attorney, Agent, or Firm*—Bachman & LaPointe, P.C.

(57) ABSTRACT

The present invention relates to a method for repairing components such as blades used in turbine engines. The method comprises the steps of placing a piece of refractory metal material over an area of the component to be repaired and depositing a repair filler metal material over the piece of refractory material in an amount sufficient to repair the component and welding the repair filler metal material in place. The refractory metal material may be selected from the group consisting of niobium, tantalum, molybdenum, tungsten, a metal having a melting point higher than the melting point of nickel, and alloys thereof and may be uncoated or coated.

29 Claims, 1 Drawing Sheet

REFRACTORY METAL BACKING MATERIAL FOR WELD REPAIR

BACKGROUND OF THE INVENTION

The present invention relates to a method for repairing a component, such as a turbine blade or a vane, used in a gas turbine engine.

Currently, gas turbine blade tips and trailing edge regions are repaired using a welding process such as gas tungsten arc welding without a backing material. The weld bead is used to build up cracked and worn surfaces. Problems occur when blade tip cracks expose blade internal cavities. In this case, the weld will flow into the cavity and result in a rejectable condition. In other areas, such as a blade trailing edge, weld repair will result in closure of the internal cooling features that will then need to be re-established by labor intensive blending or electrodischarge machining.

SUMMARY OF THE INVENTION

Accordingly, it is an object of the present invention to provide an improved method for repairing turbine engine components.

It is a further object of the present invention to provide a method as above which allows welding over open cavities and which does not require extensive post welding blend processing or machining.

It is yet another object of the present invention to provide a method as above which allows re-establishment of internal cooling geometry.

The foregoing objects are attained by the method of the present invention.

In accordance with the present invention, a method for repairing a component used in a turbine engine broadly comprises the steps of placing a piece of refractory metal material over an area of the component to be repaired and depositing a repair filler metal material over the piece of refractory metal material in an amount sufficient to repair the component and welding same. The refractory metal material may be any refractory material having a melting point in excess of 1455° C. (2651° F.) and may be coated or uncoated.

Other details of the repair method of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

In accordance with the present invention, a method is provided for repairing a turbine engine component, such as a turbine blade or vane, formed from a superalloy material, such as a nickel-based or cobalt-based alloy, and used in a gas turbine engine. The method broadly comprises placing a piece of refractory metal material over the area of the component to be repaired and depositing a repair filler metal material over the refractory metal material in an amount sufficient to fill in the space being repaired and welding same. The refractory metal material acts as a backing material for preventing the repair filler metal material from entering internal cavities such as internal cooling cavities.

Figure 1:
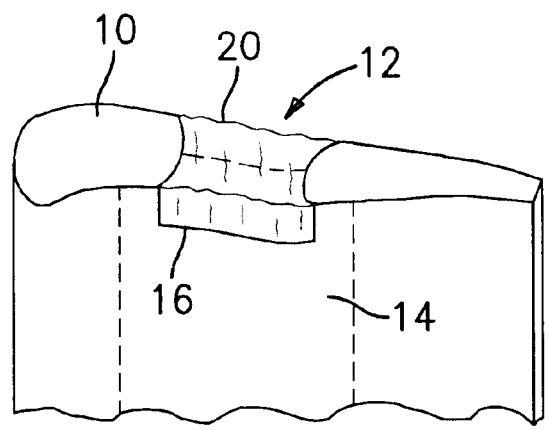
FIG. 1 illustrates a tip of a turbine engine blade repaired in accordance with the present invention.

Referring now to FIG. 1, a tip 10 of a turbine blade to be repaired is illustrated. The blade tip 10 has an area 12 to be repaired. The blade tip 10 has an open internal cooling cavity 14 in the area to be repaired. In such a circumstance, it is necessary that the internal cooling cavity 14 be protected from the introduction of the repair material. To this end, a piece 16 of backing material formed from a refractory metal material is positioned over the area to be repaired to prevent the entry of the repair material into the cavity 14. The refractory metal material preferably has a melting point in excess of 1455° C. (2651° F.) and most preferably a melting point in excess of 1650° C. (3000° F.). Suitable refractory metals for the backing material 16 include, niobium, tantalum, molybdenum, tungsten, metals having a melting point higher than the melting point of nickel, such as platinum, iridium, and the like, and their alloys.

The refractory metal backing material 16 may be uncoated or coated. If heat input of the repair is high, a diffusion barrier coating can be applied to the refractory material. Candidates include, but are not limited to, oxide ceramics such as alumina or mullite. If an oxide ceramic coating is used, an intermediate coating layer such as a silicide may be used to help coating adherence. When coated with ceramic, it is preferred to nickel plate over the alumina or mullite to aid in wetting the repair filler metal. The coating system may also include a nickel aluminide layer left behind after repair to improve the oxidation resistance of the coating. Alternatively, the refractory metal backing material may just be nickel plated using electrolytic nickel on at least one side if heat input is low. As previously mentioned, the presence of the coating enhances the wettability of the backing material during the subsequent welding process.

After the refractory metal backing material 16 has been positioned in the area 12, a repair filler metal material 20 is deposited over the backing material 16 and subjected to a welding operation. The repair filler metal material is preferably deposited in an amount sufficient to fill the area 12 to be repaired. The repair filler metal material may comprise a cobalt based material, such as MERL 72, or a nickel based material, such as INCO 625. Alternatively, the repair filler metal may be a filler metal of the base alloy composition. The repair filler metal material may be applied using any suitable welding technique known in the art such as a TIG repair welding technique. During the welding step, the heat input may be kept low to prevent alloying.

Once the repair filler metal material 20 has solidified, the refractory metal backing material 16 may be removed by an acid chemical treatment using a nitric acid-sulfuric acid solution. The solution may have 2 parts nitric acid and 1 part sulfuric acid added to 2 parts water. The mixture is preferably heated to a temperature up to 150° F. to increase the dissolution rate.

Alternatively, the refractory metal backing material 16 may be removed using an oxidizing heat treatment in which air is flowed through the interior of the blade. The flowing air may be at a temperature in the range of 1400° F. to 1650° F. and may be flowed through the blade interior for a time in the range of from 1 to 4 hours. The oxidizing heat treatment may be performed either in a furnace or by direct resistant heating.

The removal of the refractory metal backing material may be omitted if the alloying of the refractory metal with filler material is controlled.

Figure 2:
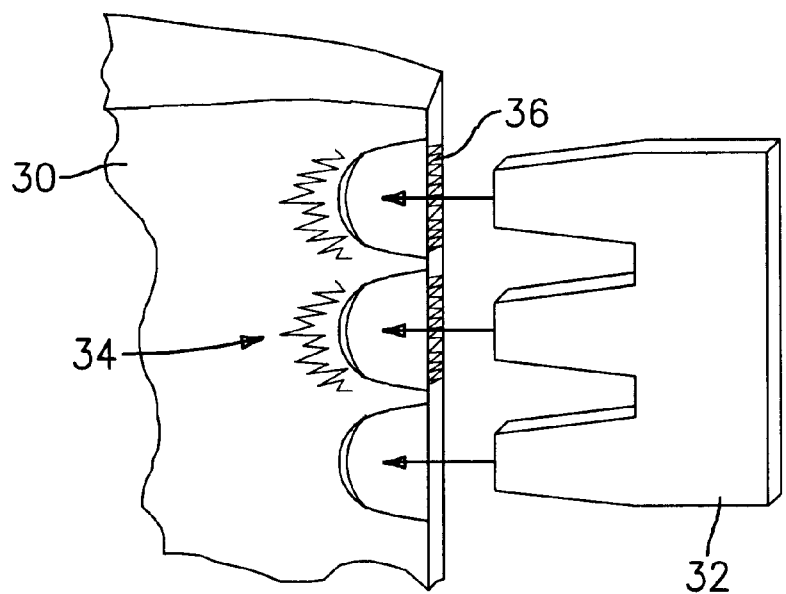
FIG. 2 illustrates a technique for repairing a trailing edge portion of a turbine engine blade.

Referring now to FIG. 2, a method for repairing a trailing edge 30 of a turbine blade is illustrated. In this method, a piece 32 of refractory metal backing material is first cut to conform to the shape of the blade trailing edge and any internal cooling cavity therein. Any suitable cutting technique known in the art such as laser cutting, photo etching, stamping, or water jet cutting may be used to cut the refractory metal backing material. The refractory metal material may be one of the materials mentioned hereinabove and may be coated or uncoated as discussed above. The piece 32 of refractory metal backing material, preferably in foil form, is placed over the area 34 to be repaired. A repair filler metal material is then deposited over the piece of refractory material 32 and subjected to a welding treatment to re-establish the blade trailing edge including its cooling features 36.

After the repair filler metal material has solidified, the refractory metal backing material may be removed using either an acid chemical treatment, such as that described above, or an oxidizing heat treatment, such as that described above.

The present invention is advantageous in that it allows a refractory metal material to acts as a weld backing material to allow welding over open cavities or to re-establish internal cooling geometry. The refractory metal material can later be removed if desired without the need for extensive post welding blend processing or machining such as EDM machining. This method has particular utility in the repair of investment castings.

It is apparent that there has been provided a method for repairing turbine blades which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for repairing a component comprising the steps of:
   placing a piece of refractory metal material over an area of said component to be repaired; and
   depositing a repair filler metal material over said piece of refractory metal material in an amount sufficient to repair said component and subjecting said repair filler metal material to a welding treatment.

2. A method according to claim 1, wherein said placing step comprises placing a piece of material formed from a material selected from the group consisting of niobium, tantalum, molybdenum, tungsten, a metal having a melting point higher than the melting point of nickel, and alloys thereof over said area.

3. A method according to claim 1, wherein said placing step comprises placing a piece of refractory metal material having a nickel plating on at least one surface over said area.

4. A method according to claim 1, wherein said placing step comprises placing a piece of refractory metal material having a chromium coating on at least one surface over said area.

5. A method according to claim 1, wherein said placing step comprises placing a piece of refractory metal material, having a diffusion barrier coating.

6. A method according to claim 5, wherein said placing step comprises placing a piece of refractory metal material having a coating comprising an alumina or mullite coating.

7. A method according to claim 5, wherein said placing step comprises placing a piece of refractory metal material having an alumina or mullite coating layer and an intermediate silicide layer.

8. A method according to claim 7, wherein said refractory metal material further has a nickel plating over said outer layer.

9. A method according to claim 1, wherein said placing step comprises placing a piece of refractory metal material having a melting point in excess of 1455° C. over said area.

10. A method according to claim 9, wherein said refractory metal material has a melting point in excess of 1650° C.

11. A method according to claim 1, wherein said component comprises a component for a turbine engine having an internal cooling cavity and said placing step comprises positioning said refractory metal material so as to prevent said repair filler metal material from entering said internal cooling cavity.

12. A method according to claim 1, wherein said refractory metal material is a cut foil which conforms to a shape of an internal cooling cavity in said component.

13. A method according to claim 1, further comprising removing said refractory metal material after said welding step has been completed using an acid chemical treatment.

14. A method according to claim 1, further comprising removing said refractory metal material after said welding step has been completed using an oxidizing heat treatment.

15. A method according to claim 1, wherein said placing step comprises placing said piece of refractory metal material over an area of an investment cast compact to be repaired.

16. A method for repairing a tip portion of a turbine blade comprising the steps of:
   positioning a refractory metal backing material over an area to be repaired; and
   depositing a repair filler metal material over said refractory material and welding said repair filler metal material.

17. A method according to claim 16, wherein said positioning step comprises positioning a piece of refractory metal material selected from the group consisting of niobium, tantalum, molybdenum, tungsten, a metal having a melting point higher than the melting point of nickel, and alloys thereof over said area to be repaired.

18. A method according to claim 16, wherein said positioning step comprises positioning a piece of refractory metal material plated with a nickel containing material over said area to be repaired.

19. A method according to claim 16, wherein said positioning step comprises positioning a piece of refractory metal material coated with a chromium containing material over said area to be repaired.

20. A method according to claim 16, wherein said positioning step comprises positioning a piece of refractory metal material having an oxide ceramic coating layer, an intermediate layer of silicide, and a plated nickel outer layer over said area to be repaired.

21. A method according to claim 16, further comprising removing said refractory metal material after said welding step has been completed using an acid chemical treatment.

22. A method according to claim 16, further comprising removing said refractory metal material after said welding step has been completed using an oxidizing heat treatment.

23. A method for repairing a trailing edge of a turbine blade comprising:
   cutting a refractory metal material foil to conform to a trailing edge shape of said blade;

positioning said cut refractory metal material foil over a portion of said trailing edge to be repaired; and applying a repair filler metal material over said refractory metal material foil and welding said repair filler metal material to effect said repair.

24. A method according to claim 23, wherein said cutting step comprises cutting a foil material formed from a refractory metal selected from the group consisting of niobium, tantalum, molybdenum, tungsten, a metal having a melting point higher than the melting point of nickel, and alloys thereof.

25. A method according to claim 24, wherein said foil material has a nickel plating thereon.

26. A method according to claim 24, wherein said foil material has a chromium coating thereon.

27. A method according to claim 24, wherein said foil material has a nickel plated ceramic coating thereon.

28. A method according to claim 23, further comprising removing said refractory metal foil material after said welding step has been completed using an acid chemical treatment.

29. A method according to claim 23, further comprising removing said refractory metal foil material after said welding step has been completed using an oxidizing heat treatment.

* * * * *